J. V. ROBINSON.
AUTOMATIC TRAIN PIPE CONNECTOR.
APPLICATION FILED MAR. 18, 1914.
1,245,793.
Patented Nov. 6, 1917.
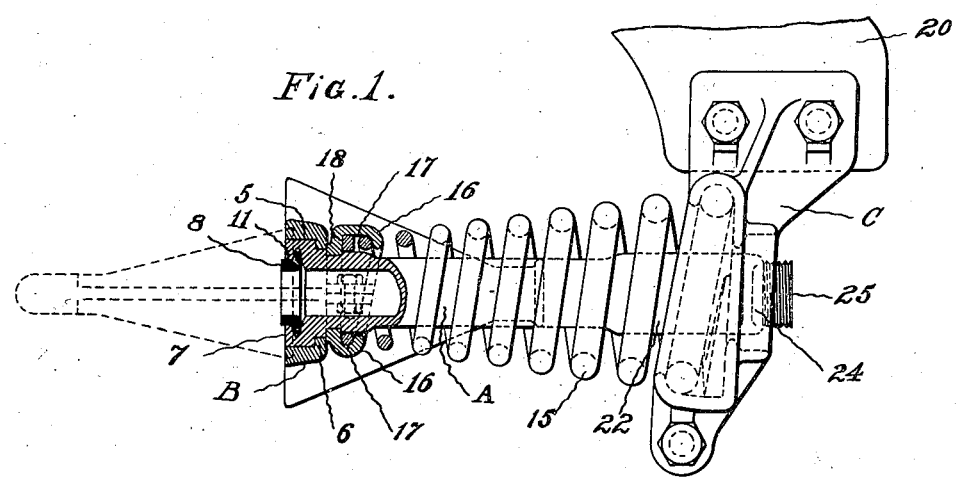
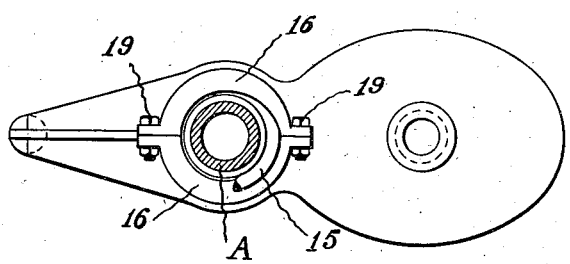
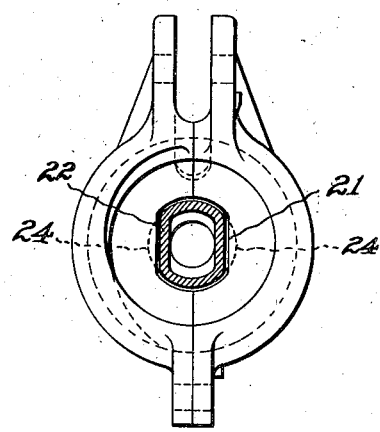
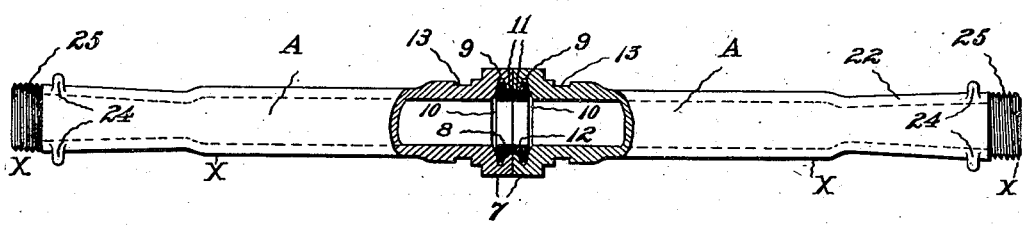
Witnesses
Inventor
J. V. Robinson
By
Attorneys

UNITED STATES PATENT OFFICE.

JOSEPH V. ROBINSON, OF CHEVY CHASE, MARYLAND.

AUTOMATIC TRAIN-PIPE CONNECTOR.

1,245,793.         Specification of Letters Patent.         Patented Nov. 6, 1917.

Continuation in part of applications Serial No. 737,726, filed December 19, 1912, and Serial No. 737,892, filed December 20, 1912. This application filed March 18, 1914. Serial No. 825,632.

*To all whom it may concern:*

Be it known that I, JOSEPH V. ROBINSON, a citizen of the United States, and resident of Chevy Chase, in the county of Montgomery, State of Maryland, have invented certain new and useful Improvements in Automatic Train-Pipe Connectors, of which the following is a specification.

My invention relates to automatic train pipe connectors and has for its object to provide an improved fluid conduit and an improved coupling head through which the conduit extends to abut with a similar conduit of an opposing connector in service. I provide the abutting end of the conduit with an air extended gasket, whereby considerable angular movement between the faces of coupled connector heads may occur without destroying the air tight connection between the abutting ends of said conduits. The conduit is removably mounted in the connector head in a novel manner and carries an improved means for locking to it the buffer spring of the automatic connector.

The invention consists in the improvements, arrangements and combinations hereinafter described, pointed out in the appended claims, and illustrated in the accompanying drawings, in which:

Figure 1, is a sectional side elevation showing my improved conduit mounted in an automatic connector head.

Fig. 2, is a rear view of the connector head showing the means of securing the supporting spring to the conduit.

Fig. 3, is a front face view of the supporting base showing the non-circular opening in its center, and Fig. 4, is a plan view of two of the conduits butted together as they would appear in service.

Referring to the drawings: I show my improved conduit or stem A mounted in a coupling head B of the pin and funnel type, which I improve by providing the head with a centrally located aperture 5 from the walls of which projects an annular flange or stop 6. The forward end of the conduit is provided with an enlarged portion or shoulder 7 which lies within the aperture of the head B, and bears against the flange 6 of said head. The conduit is removably mounted in the aperture 5 and assembled therein from the front of the head. A suitable gasket or sealing member 8, preferably of rubber, is seated in a circumferential recess or seat 9 of the portion or shoulder 7 of the conduit, which recess is flared at 10 to subject the rear face of the gasket to the direct action of the air pressure within the stem A, whereby the gasket will have a piston action relative to the conduit and be extended into tight engagement with a mating gasket of an opposing connector, even when the faces of coupled connector heads are separated considerably. In like manner the gaskets will be extended into tight engagement with the non-yieldable walls 11 of the abutting ends of mating conduits by the pressure of the air acting upon the interior of the gaskets at 12.

Immediately at the rear of the flange 6 the conduit is provided with an annular groove 13 for receiving a clamp for locking the conduit tightly in the aperture 5 and to the connector head B, and for tying to the conduit the apex end of a conical spiral buffer spring 15, which spring supports the connector head and operates to place it under pressure in coupling.

The clamp comprises halves 16, each having on its inner face a semi-circumferential recess or groove 17, and an annular seat 18 for receiving the spring, the halves being clamped together about said spring and in the annular groove 13 of the conduit by a suitable means, such as bolts 19. The spring is coiled of a gradually tapering bar and has its large end suitably secured to a base C by which base the automatic connector is suspended from a lug or bracket 20 of the car.

The base C is provided with a non-circular opening 21 for closely receiving a correspondingly shaped portion 22 of the conduit A, to prevent undue rotation of the conduit and connector head in service. In giving to a portion of the conduit this non-circular conformation, I flatten and taper inwardly its sides, as shown, to permit partial rotation of both the connector head B and the conduit when coupled up. A shoulder or stop 24 is provided on the rear end of the conduit or stem for preventing excessive movement of the coupling head forwardly of the base and is threaded at 25 to receive the train pipe hose of the car equipped with the automatic connector. Several of the features hereinbefore described have been previously presented in earlier applications, namely, application Serial No. 737,728, filed December 19, 1912, and Serial No. 737,892, filed December 20, 1912, claims for such subjects-matter having been withdrawn from the applications referred to in compliance with the requirements for division. As to these features therefore the present case is a continuation of said earlier applications.

Thus I provide an improved fluid conduit or pipe adapted to be removably or permanently mounted in a train pipe connector head and to abut with a companion pipe when opposing connector heads couple up in service. With my improvement there is no air connection between the conduit and the head B, the connection from one car to another being practically continuous when mating conduits abut. The number of air connections being minimized by my improvement, the danger of leaks is greatly abated while the piston action of the gaskets 5 insures a tight joint between abutting conduits, even when the conduits are separated considerably as sometimes occurs on account of relative angular movement of coupled connector heads B in service.

Having thus described my said invention, what I claim as new and desire to secure by United States Letters Patent is:

1. In an automatic train pipe connector, the combination of a perforated coupling head, a flange at one end of said perforation the flange being provided with an opening of less diameter than that of said perforation, a base, a conduit extending through said head and base and provided with a shoulder abutting said flange, and a spring interposed between said head and base and surrounding said conduit and exerting pressure against said flange.

2. In an automatic train pipe connector, the combination of a coupling head, a base provided with a non-circular opening, and a stem provided with a non-circular portion extending through said opening, said portion being tapered to allow partial rotation of said head when the latter is coupled up in service.

3. In an automatic train pipe connector, the combination of a coupling head, a spring for extending the head, a base having a non-circular opening, a stem extending through the head and provided with a gasket and having also a non-circular portion operating in the opening of said base to prevent undue relative rotation of the stem and coupling head at all times, and a collar in rear of said non-circular portion of the conduit for engaging the base to prevent undue forward movement of the stem relative to said base.

4. In an automatic train pipe connector, the combination of a connector head, a stem projecting from the head, a spring for placing the head under pressure, and a clamp for securing said spring to said stem.

5. In an automatic train pipe connector, the combination of a connector head, a fluid conduit removably mounted in the head, a spring for extending said head, and a clamp for securing said spring and conduit against axial shifting relative to said head.

6. In an automatic train pipe connector, the combination of a coupling head, a fluid conduit for the head, a spring for extending said head, a clamp for securing said spring to said conduit, said clamp comprising halves having on their inner face a recess, and means for securing said halves together with one end of said spring seated in said recess.

7. In an automatic train pipe connector, the combination of a coupling head, a fluid conduit for the head provided with an annular groove, a spring for extending the head, and a clamp seated in said groove for securing said spring to said conduit.

8. In an automatic train pipe connector, the combination with a perforated coupling head and a support therefor, of a flange at one end of said perforation provided with an opening of less diameter than that of the perforation, a base having a non-circular opening, a conduit extending through said head and having a shoulder abutting said flange, said conduit being provided also with a non-circular portion operating in the opening in said base to prevent undue rotation of the head and conduit, a collar carried by said conduit to limit the movement of said head forwardly of said base, and means for connecting the hose of a car to said conduit.

In testimony whereof I have hereunto set my hand in the presence of two witnesses.

JOSEPH V. ROBINSON.

Witnesses:
ARTHUR L. BRYANT,
S. C. McBRIDE.